United States Patent [19]

Gelles

[11] Patent Number: 5,051,457

[45] Date of Patent: Sep. 24, 1991

[54] ASPHALT-BLOCK COPOLYMER ROOFING COMPOSITION

[75] Inventor: Richard Gelles, Houston, Tex.

[73] Assignee: Shell Oil Company, Houston, Tex.

[21] Appl. No.: 553,042

[22] Filed: Jul. 16, 1990

[51] Int. Cl.$^5$ .............................................. C08L 95/00
[52] U.S. Cl. ...................................... 524/68; 427/443; 427/445
[58] Field of Search ................... 524/68; 427/443, 445

[56] References Cited

U.S. PATENT DOCUMENTS

| Re. 27,145 | 6/1971 | Jones | 260/880 |
|---|---|---|---|
| 3,345,316 | 10/1967 | Nielsen | 260/28.5 |
| 3,611,888 | 10/1971 | Kavalir et al. | 94/18 |
| 3,856,732 | 12/1974 | Bresson et al. | 260/28.5 |
| 3,978,014 | 8/1976 | van Beem et al. | 260/28.5 |
| 4,032,491 | 6/1977 | Scheenke | 524/68 |
| 4,172,061 | 10/1979 | Bresson | 260/28.5 |
| 4,196,115 | 4/1980 | Bresson | 524/68 |
| 4,250,067 | 2/1981 | Bresson | 260/28.5 |
| 4,282,127 | 8/1981 | Desgouilles | 260/28.5 |
| 4,332,703 | 6/1982 | Lijzenga et al. | 524/68 |
| 4,368,228 | 1/1983 | Gorgati | 428/402 |
| 4,412,019 | 10/1983 | Kraus | 524/71 |
| 4,490,493 | 12/1984 | Mikols | 524/68 |
| 4,503,176 | 3/1985 | Barlow et al. | 524/62 |
| 4,738,996 | 4/1988 | Vonk et al. | 524/59 |
| 4,835,199 | 5/1989 | Futamura et al. | 524/68 |

FOREIGN PATENT DOCUMENTS

| 740027 | 8/1966 | Australia | 400/43 |
|---|---|---|---|
| 859226 | 12/1970 | Canada | 400/41 |
| 234615 | 9/1987 | European Pat. Off. | |
| 238149 | 9/1987 | European Pat. Off. | |
| 280357 | 8/1988 | European Pat. Off. | |
| 285865 | 10/1988 | European Pat. Off. | |
| 1130140 | 10/1968 | United Kingdom . | |
| 1143895 | 2/1969 | United Kingdom . | |
| 1279644 | 6/1972 | United Kingdom . | |
| 1284726 | 8/1972 | United Kingdom . | |
| 1329298 | 9/1973 | United Kingdom . | |
| 1338477 | 11/1973 | United Kingdom . | |
| 1554739 | 10/1979 | United Kingdom . | |

OTHER PUBLICATIONS

Letter from Inventor to Grant Mitchell dated May 25, 1989.

Abstract of Japanese Patent 63-268766, 11/88, Shiraki et al.

Abstract of Japanese Patent 01-101371, 4/89, Shiraki et al.

*Primary Examiner*—Allan M. Lieberman

[57] ABSTRACT

A composition for use in roll roofing membrane applications which comprise:

(a) from about 93 to about 87 parts per hundred of a bituminous component having a penetration of less than about 125 (decamillimeters) at 25° C. and (b) from about 7 to about 13 parts per hundred of a hydrogenated block copolymer of a monoalkenyl aromatic hydrocarbon and a conjugated diolefin having a contour arm molecular weight before hydrogenation of from about 105,000 to about 140,000 and a polystyrene content of from about 25% to about 37%.

2 Claims, No Drawings

ASPHALT-BLOCK COPOLYMER ROOFING COMPOSITION

BACKGROUND OF THE INVENTION

Asphalt is a common material utilized for the preparation of roofing members and coatings which may be applied as mopping grade asphalts, cutbacks in solvents, single ply membranes, shingles, roll roofing membranes, etc. While the material is suitable in many respects, it inherently is deficient in some physical properties which it would be highly desirable to improve. Efforts have been made in this direction by addition of certain conjugated diene rubbers, neoprene, resins, fillers and other materials for the modification of one or more of the physical properties of the asphalt binder. Each of these added materials modifies the asphalt in one respect or another but certain deficiencies can be noted in all compounds proposed For example, some of them have excellent weather resistance, sealing and bonding properties but are often deficient with respect to warm tack, modulus, hardness and other physical properties.

Since the late 1960s, styrene-butadiene rubber and styrene-rubber block copolymers such as styrene-butadiene-styrene and styrene-isoprenestyrene block copolymers have been used to dramatically improve the thermal and mechanical properties of asphalts. Practical application of the rubber addition approach requires that the blended product retain improved properties and homogenity during transportation, storage and processing. Long term performance of elastomer-modified asphalts also depends on the ability of the blend to maintain thermal and chemical stability.

To be suitable for synthetic roofing materials, the asphalt-block copolymer mixtures should meet the following requirements:

(a) sufficient resistance to flow at high temperatures,
(b) sufficient flexibility at low temperatures,
(c) workability according to the conventional methods used in the roofing technique,
(d) adequate hot storage stability,
(e) adequate hardness to prevent deformation during walking on the roof, and
(f) if it is to be used as an adhesive, sufficient adhesion.

For roll roofing applications, it is preferred that the softening point (the temperature at which the material will tend to flow) be above about 250° F., the cold bend temperature, which is not as critical a parameter as the others in this application, (the temperature at which the material will crack during application and service) should be above about −5° C. and that the asphalt and block copolymer components should be able to be mixed at a temperature no higher than about 200° C. to keep the asphalt heating costs down and to prevent softening of the polyester reinforcement commonly used in these membranes.

For roll roofing membranes, the bituminous composition is used to saturate and coat a reinforcing mat. The bitumen is there to make the membrane waterproof. The mat is used to aid in mechanical properties (gives the membrane strength etc.). Polymer is added to the asphalt to improve the weatherability and mechanical properties of the asphalt.

At the present time, unhydrogenated block copolymers are being used in roll roofing applications. For instance, a linear unhydrogenated styrene-butadiene-styrene block copolymer with a total molecular weight of 110,000 and a polystyrene content of 31% could be used for such applications. When 12% of this block copolymer is used with AC-10 blend asphalt (defined later in the examples), the softening point is about 230° F., the cold bend temperature is about −25° C. and the components can be mixed at a temperature of approximately 160°–180° C. Another unhydrogenated block copolymer, a coupled radial styrene-butadiene block copolymer with a total molecular weight of 264,000 and a polystyrene content of 31%, could also be used in such applications. When blended with the same asphalt at the same concentration, the softening point is approximately 262° F., the cold bend temperature is approximately −25° C. and the components can be mixed at approximately 180°–200° C. Unhydrogenated block copolymers have certain disadvantages which can cause problems when used in applications such as these. Such disadvantages include poor stability of the block copolymer during blending and storage of the bituminous composition and poor long term stability when the bituminous composition is exposed to the elements (by stability I mean resistance to degradation).

SUMMARY OF THE INVENTION

This invention relates to a composition for use in roll roofing membrane applications. The composition comprises about 93 to about 87 parts per hundred of a bituminous component having a penetration of less than about 125 (decamillimeters) at 25° C. and from about 7 to about 13 parts per hundred of a hydrogenated block copolymer of a monoalkenyl aromatic hydrocarbon and a conjugated diolefin having a contour arm molecular weight before hydrogenation of from about 105,000 to about 140,000 and a polystyrene content of from about 25% to about 37%.

DETAILED DESCRIPTION OF THE INVENTION

The bituminous component in the bituminous-block copolymer compositions according to the present invention may be a naturally occurring bitumen or derived from a mineral oil. Also petroleum derivatives obtained by a cracking process and coal tar can be used as the bituminous component as well as blends of various bituminous materials.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues. Suitable bituminous components (either "straight-run bitumens" or "fluxed bitumens") are those having a penetration of less than about 125 (decamillimeters) at 25° C. This limitation excludes many of the softer bituminous components such as pure fluxes and pure aromatic extracts which are too tacky for this application. In addition, their use requires high levels of high molecular weight block copolymer to meet softening point requirements, which is expensive. The amount of bituminous component to be used in the compositions of the present invention range from about 93 to about 87 parts per hundred.

The block copolymer component is a hydrogenated block copolymer of a monoalkenyl aromatic hydrocarbon such as styrene and a conjugated diolefin such as butadiene or isoprene. Such elastomeric block copolymers can have general formulas A-B-A or $(AB)_nX$ wherein each A block is a monoalkenyl aromatic hydrocarbon polymer block, each B block is a conjugated diolefin polymer block, X is a coupling agent, and n is an integer from 2-30. Such block copolymers may be linear or may have a radial or star configuration as well as being tapered. Block copolymers such as these are well known and are described in many patents including reissue 27,145 issued June 22, 1971 which describes hydrogenated block copolymers containing butadiene. This patent is herein incorporated by reference. The description of the type of polymers, the method of manufacturing the polymers and the method of hydrogenation of the polymers is described therein and is applicable to the production of block copolymer containing other alkenyl aromatic hydrocarbons and other conjugated diolefins such as isoprene or mixtures of conjugated diolefins.

The hydrogenated block copolymers of the present invention are used in an amount from about 7 to about 13 parts per hundred. If less than about 7 parts of the block copolymers are used, then the cold temperature properties are usually not good enough. More than about 13 parts is usually not necessary to obtain the desired properties so any more would only increase the cost with very little benefit. Negatives at higher loadings include difficulties blending and processing due to high viscosities.

The block copolymer should have a molecular weight before hydrogenation of from about 105,000 to about 140,000. A lower molecular weight polymer would not provide sufficient properties without adding more of the polymer and thus adding to the expense. Also, the lower molecular weight polymers usually have a softening point which is below the minimum required of 250° F. If the molecular weight is above about 140,000, then a mixing temperature above the required 200° C. is usually required and thus the polymer is not desirable.

The molecular weight ranges referred to herein are the contour arm molecular weights. Radial and star polymers have much higher total molecular weight than linear polymers do but the mechanical properties considered herein are dependent not upon the total molecular weight in the case of radial and star polymers but rather on the molecular weight of the contour arms of those polymers. For a linear A-B-A polymer, the contour molecular weight is the same as the total molecular weight and the molecular weight range of the present invention is 105,000 to 140,000 for linear polymers. For three arm radial polymers, one must multiply the contour arm molecular weight by 1.5 to obtain the total molecular weight. Thus, the total molecular weight range for a three arm polymer of the present invention would be 157,500 to 210,000. For a four arm radial polymer, the range would be two times the contour molecular weight range or 210,000 to 280,000. In general, for a coupled radial or star polymer the contour molecular weight is the molecular weight along the contour of the molecule, which is (AB)₂. Thus, for a coupled radial or star polymer (AB)nX, the total molecular weight range is $$\frac{n}{2}$$

times the contour molecular weight range.

In order to be effective in the present application, the block polymer must have a polystyrene content ranging from about 25% to about 37%. If the polystyrene content is lower than about 25%, the physical properties are decreased and the molecular weight of the polymer would have to be much higher to get the proper physical properties and increasing the molecular weight causes mixing problems as stated above. It also increases the cost of the polymer. If the polystyrene content is above about 37%, the bituminous component and the block polymer component are generally too hard to mix. The elastomeric properties tend to decrease because of the presence of a continuous styrene phase in the polymer.

The compositions of the present invention may contain other materials such as fillers including calcium carbonate, limestone, chalk, ground rubber tires, etc. Other materials which may be incorporated in these composition include unsaturated block copolymers like SBS or SIS, etc. If other materials are added, the relative amounts of the bitumen and polymer specified above remain the same.

The bituminous block copolymer compositions of the present invention may be prepared by various methods. A convenient method comprises blending of the two components at an elevated temperature, preferably not more than about 200° C. for the reasons discussed above. Other methods for preparing the composition of the present invention include precipitation or drying of the components from a common solvent and emulsifying the polymer with an asphalt emulsion.

EXAMPLES

Blends of asphalt and block copolymer were prepared using a laboratory Silverson high shear mixer. An appropriate amount of asphalt was heated in a quart can in an oven at 160° C. for 45 minutes. The quart can was then placed in a heating mantel and, with heat and stirring, its temperature was raised to the mixing temperature. The polymer was then added slowly. Mixing was completed after the homogenity of the mixture (judged visually) did not change for 15 minutes. To determine the mixing temperature used, an experiment was first performed in the following manner: the asphalt temperature was first set at 180° C. and the polymer was added. If it did not start to mix after 10 minutes, the temperature was raised 5° C. This was repeated until the initial temperature at which the polymer began to mix was determined.

The softening point measurements utilized herein were determined by ASTM D36. The penetration of the asphalts used herein was determined by ASTM D5. In order to determine the cold bend properties, samples 0.125 inches by 0.5 inches by 2.5 inches were prepared by pouring the molten blend into a mold and then pressing using shims. The next day the samples were placed in an environmental chamber and allowed to equilibrate at a starting temperature (e.g. −10° C.) for three hours. After equilibration, the samples were bent around a 1 inch cylindrical mandrel at a rate of 180° per 5 seconds. At this and subsequent temperatures, three samples were tested. The samples would either break or bend. Next, the chamber temperature was lowered 5° C. and allowed to equilibrate for one-half hour. The samples were then tested at that temperature. The process was continued until all three samples failed at a particular temperature. The lowest temperature at which all samples passed (bent without cracking) was reported as the cold bend temperature.

The asphalt used in the following examples was an AC-10 grade from the Shell Oil Company Wood River Refinery. It had a softening point of 135° F. and a penetration measured with conditions of 100 grams, 5 seconds and 77° F. (25° C.) of 120 dmm. Asphalts with considerably higher penetration will produce compositions which are too tacky for the present use. In addition their use requires high levels of high molecular weight block copolymers to meet softening point requirements, which is expensive.

Five different samples of sequentially polymerized linear hydrogenated styrene-butadiene-styrene block copolymers were used in the following examples. The polymers were chosen to have varying molecular weights and varying polystyrene contents. They were added in two different concentrations, 9% and 12%. The results are shown in Table 1.

TABLE 1

| Polymer | Contour Arm Molecular Weight | PSC (%) | Concentration (%) | Softening Point (°F.) | Cold Bend (°C.) | Mixing Temperature (°C.) |
|---|---|---|---|---|---|---|
| Polymer 1 | 91 | 31 | 12 | 248 | −33 | 200 |
| Polymer 2 | 120 | 31 | 12 | 291 | −27 | 200 |
| Polymer 2 | 120 | 31 | 9 | 261 | −15 | 200 |
| Polymer 3 | 152 | 33 | 12 | 317 | −20 | 230 |
| Polymer 4 | 165 | 22 | 12 | 310 | −23 | 225 |
| Polymer 5 | 180 | 33 | 12 | >320 | −17 | 260 |

It can be seen that Polymer 1 with a molecular weight of only 91,000 is not acceptable because the softening point is below the minimum of 250° F. Also, Polymers 3, 4 and 5, which have molecular weights of 152,000, 165,000 and 180,000, are unacceptable because they require a mixing temperature which is above the maximum acceptable of 200° C. Thus, only Polymer 2 which has a molecular weight of 120,000 and a polystyrene content of 31% is acceptable in that the softening point is above 250° F. and the mixing temperature is 200° C. This polymer was used at two different concentrations.

Comparison of Linear and Radial Polymers by Contour Molecular Weight

Table 2 contains a comparison of the properties of Polymer 6, a hydrogenated styrene-butadiene-styrene linear block copolymer, and Polymer 7, a hydrogenated styrene-butadiene coupled radial block copolymer with three arms.

TABLE 2

| Polymer | Contour Arm Molecular Weight | PSC (%) | Softening Point (°F.) | Cold Bend (°C.) | Mixing Temperature (°C.) |
|---|---|---|---|---|---|
| Polymer 6 | 165,000 | 22 | 310 | −23 | 220 |
| Polymer 7 | 205,000 | 20 | 290 | −17 | 220 |

Polymer 7, being a three armed polymer, has a much higher total molecular weight than that of Polymer 6. However, the equivalent or contour molecular weights are relatively close together and it can be seen that the properties are very similar. The small property differences are mainly attributed to the fact that Polymer 7 does contain some uncoupled polymer (it contained approximately 17% A-B polymer). Table 2 shows that polymers with equivalent contour arm structure, i.e. molecular weight, have equivalent properties.

The Properties of Hydrogenated Block Copolymers Cannot be Predicted From the Properties of Unhydrogenated Block Copolymers In Table 3, the properties of bituminous blends with Polymer 8, a coupled unhydrogenated styrene-butadiene-styrene block copolymer, and Polymer 9, a sequentially polymerized linear hydrogenated styrene-butadienestyrene block copolymer, are compared.

TABLE 3

| Polymer | Contour Arm Molecular Weight | PSC (%) | Concentration (%) | Softening Point (°F.) | Cold Blend (°C.) |
|---|---|---|---|---|---|
| Polymer 8 | 110 | 31 | 12 | 230 | −25 |
| Polymer 9 | 61 | 29 | 12 | 223 | −25 |

It can be seen that the above two polymers have approximately the same softening point and cold bend temperature. These physical properties are very close even though Polymer 8 has a total molecular weight which is almost twice the total molecular weight of Polymer 9.

I claim:
1. A composition for use in roll roofing membrane applications which comprises:
    (a) from about 93 to about 87 parts per hundred of a bituminous component having a penetration of less than about 125 (decamillimeters) at 25° C. and
    (b) from about 7 to about 13 parts per hundred of a hydrogenated block copolymer of a monoalkenyl aromatic hydrocarbon and a conjugated diolefin having a contour arm molecular weight before hydrogenation of from about 105,000 to about 140,000 and a monoalkenyl aromatic hydrocarbon content of from about 25% to about 37%.
2. A process of making a roll roofing membrane which comprises:
    (i) providing a composition comprising
        (a) from about 93 to about 87 parts per hundred of a bituminous component having a penetration of less than about 125 (decamillimeters) at 25° C. and
        (b) from about 7 to about 13 parts per hundred of a hydrogenated block copolymer of a monoalkenyl aromatic hydrocarbon and a conjugated diolefin having a contour arm molecular weight before hydrogenation of from about 105,000 to about 140,000 and a monoalkenyl aromatic hydrocarbon content of from about 25% to about 37%, and
    (ii) applying said composition to a reinforcing mat.

* * * * *

UNITED STATES PATENT AND TRADEMARK OFFICE
CERTIFICATE OF CORRECTION

PATENT NO. : 5,051,457
DATED : September 24, 1991
INVENTOR(S) : Richard Gelles

It is certified that error appears in the above-identified patent and that said Letters Patent is hereby corrected as shown below:

In the abstract, line 5, change "decamillimeters" to "decimillimeters".
Column 1, line 51, change "above" to "below".
Column 2, line 28, change "decamillimeters" to "decimillimeters".
Column 2, line 55, change "decamillimeters" to "decimillimeters".
Column 6, line 35 (claim 1), change "decamillimeters" to "decimillimeters".
Column 6, line 49 (claim 2), change "decamillimeters" to "decimillimeters".

Signed and Sealed this

Twenty-third Day of March, 1993

*Attest:*

STEPHEN G. KUNIN

*Attesting Officer*       Acting Commissioner of Patents and Trademarks